United States Patent [19]
Saito

[11] Patent Number: 5,923,489
[45] Date of Patent: Jul. 13, 1999

[54] MAGNETIC PLAYBACK APPARATUS AND METHOD

[75] Inventor: Isao Saito, Kanagawa, Japan

[73] Assignee: Sony Corporation, Tokyo, Japan

[21] Appl. No.: 08/814,461

[22] Filed: Mar. 10, 1997

Related U.S. Application Data

[30] Foreign Application Priority Data

Mar. 15, 1996 [JP] Japan .................................. 8-087305

[51] Int. Cl.$^6$ .................................................. G11B 21/04
[52] U.S. Cl. .................................................. 360/70; 360/51
[58] Field of Search .................................. 360/51, 52, 70; 386/6, 7, 14, 68, 74, 78, 79, 80, 81, 86, 87

[56] References Cited

U.S. PATENT DOCUMENTS

| | | |
|---|---|---|
| 4,956,730 | 9/1990 | Arai et al. .................................. 360/70 |
| 5,021,896 | 6/1991 | Horino ....................................... 360/70 |
| 5,157,561 | 10/1992 | Makise et al. ............................ 360/70 |
| 5,392,163 | 2/1995 | Higuchi et al. ........................ 360/70 X |
| 5,473,588 | 12/1995 | Tanaka et al. ......................... 360/70 X |
| 5,523,896 | 6/1996 | Park ....................................... 360/51 X |

Primary Examiner—Muhammad Edun
Attorney, Agent, or Firm—Frommer Lawrence & Haug, LLP.; William S. Frommer

[57] ABSTRACT

A magnetic playback apparatus and method with which a PLL phase-locked to played-back data operates stably even when the magnetic tape on which the data is recorded is transported at a high speed of several hundred times the recording speed. During high-speed playback of a magnetic tape, the speed of the magnetic tape is detected and using this tape speed information the free-run frequency of a PLL 2 is corrected in correspondence with the azimuth angles of magnetic heads HO, HE. The rotational period of a drum servo 3 is also corrected using the tape speed information.

5 Claims, 7 Drawing Sheets

| drum diameter | $\phi$ |
|---|---|
| lead angle | $\theta s$ |
| head azimuth angle | $\alpha (=\pm \theta a)$ |

|  | normal speed | n x normal speed |
|---|---|---|
| tape transport speed | Vt1 | Vtn=nVt1 |
| head speed | Vh1 | Vhn |
| relative velocity | Vr1 | Vrn |
| trace angle | $\theta 1$ | $\theta n$ |
| playback signal frequency | fp1 | fpn |

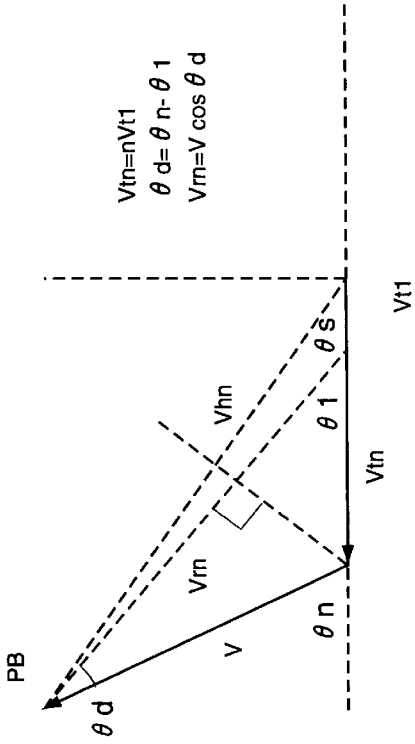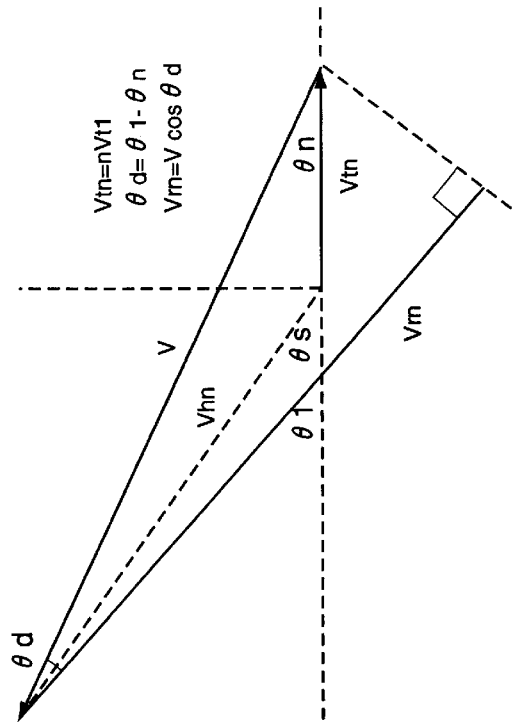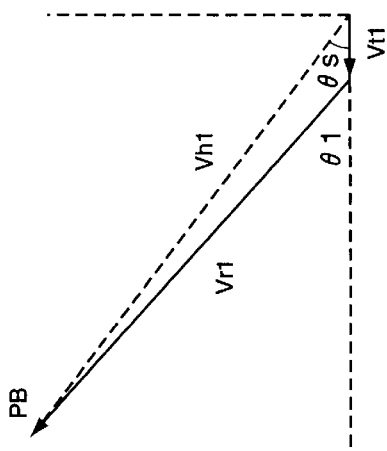

MAGNETIC PLAYBACK APPARATUS AND METHOD

BACKGROUND OF THE INVENTION

This invention relates to a recording and playback apparatus such as a digital video tape recorder (hereinafter, 'video tape recorder' will be abbreviated to 'VTR') or a digital audio tape (hereinafter abbreviated to 'DAT') recorder, and particularly to an apparatus and method in which a PLL (Phase-Locked Loop) generating a clock synchronized with data played back from a magnetic tape is so controlled that it operates stably even when the magnetic tape is being transported at a high speed.

Digital VTRs for recording and playing back a compressed and encoded video signal on a magnetic tape together with an encoded audio signal (as described in for example 'Illustrated Digital Video Reader', Yukio Kubota Ed., Ohm Co., Ltd., Aug. 25, 1996) are known. In a digital VTR, a subcode is recorded together with the video signal and the audio signal, and the format of this subcode has been established so that even when the magnetic tape is transported at a speed 200 times that of the time of recording it is possible for its content to be read (see pp. 95 and 96 of the above-mentioned 'Illustrated Digital Video Reader').

In a digital recording and playback apparatus such as a digital VTR or a DAT recorder, a clock synchronized with recorded data is generated using a PLL. The PLL has a set range over which it operates even if the frequency of the inputted data fluctuates, and in consideration of stability of operation this is set to ±5% to ±10%. Consequently, when data is played back while the magnetic tape is being transported at a high speed, because the relative speed of the magnetic tape and the magnetic head deviates from that at the time of recording in correspondence with the increase in the tape speed, when the tape speed becomes high the frequency of the played-back data leaves the above-mentioned operating range of the PLL.

To avoid this problem, in for example a digital VTR, during cue/review operation, the practice of changing the free-run frequency of a VCO (Voltage-Controlled Oscillator) inside the PLL according to the operating mode (cue/review) and thereby enabling the PLL to remain locked even when the frequency of the inputted data fluctuates is known.

However, because in this method the free-run frequency is set to a fixed value depending on the mode, at times of transition, when the tape speed is changing, an error arises. Moreover, errors also arise due to dispersion among sets and ageing and so on. Although these errors can be tolerated during cue/review operation, when the magnetic tape transport speed is relatively low, at high speeds such as 200 times the recording speed they cannot be ignored.

SUMMARY OF THE INVENTION

It is therefore an object of the invention to provide a magnetic playback apparatus and method with which the PLL operates stably even when the magnetic tape is transported at high speeds of several hundred times the recording speed.

To achieve the above-mentioned object and other objects, the invention provides a magnetic playback apparatus for playing back data recorded on diagonal tracks of a magnetic tape using a rotating magnetic head, which apparatus comprises first means for generating a clock signal phase-locked to played-back data, second means for controlling the rotational period of the rotating magnetic head, third means for correcting a free-run frequency in the first means according to magnetic tape speed information, and fourth means for correcting a rotational period in the second means according to the magnetic tape speed information.

Here, 'playback apparatus' means an apparatus having a playback function. It therefore includes recording and playback apparatuses having a recording function as well as a playback function.

The invention also provides a magnetic playback method for playing back data recorded on diagonal tracks of a magnetic tape using a rotating magnetic head, which method comprises correcting according to magnetic tape speed information a free-run frequency in means generating a clock signal phase-locked to played-back data and correcting according to magnetic tape speed information a rotational period in means controlling the rotational period of the rotating magnetic head.

According to the invention, during high-speed playback of a magnetic tape the speed of the magnetic tape is detected and using this speed information a free-run frequency in means generating a clock signal phase-locked to the played-back data is corrected and a rotational period in means controlling the rotational period of the rotating magnetic head is corrected.

BRIEF DESCRIPTION OF THE DRAWINGS

FIGS. 6A through 6C are views illustrating tape/head relative velocity during high-speed tape transport;

DETAILED DESCRIPTION OF THE PREFERRED EMBODIMENTS

A preferred embodiment of the invention will now be described in detail with reference to the accompanying drawings.

Figure 1:
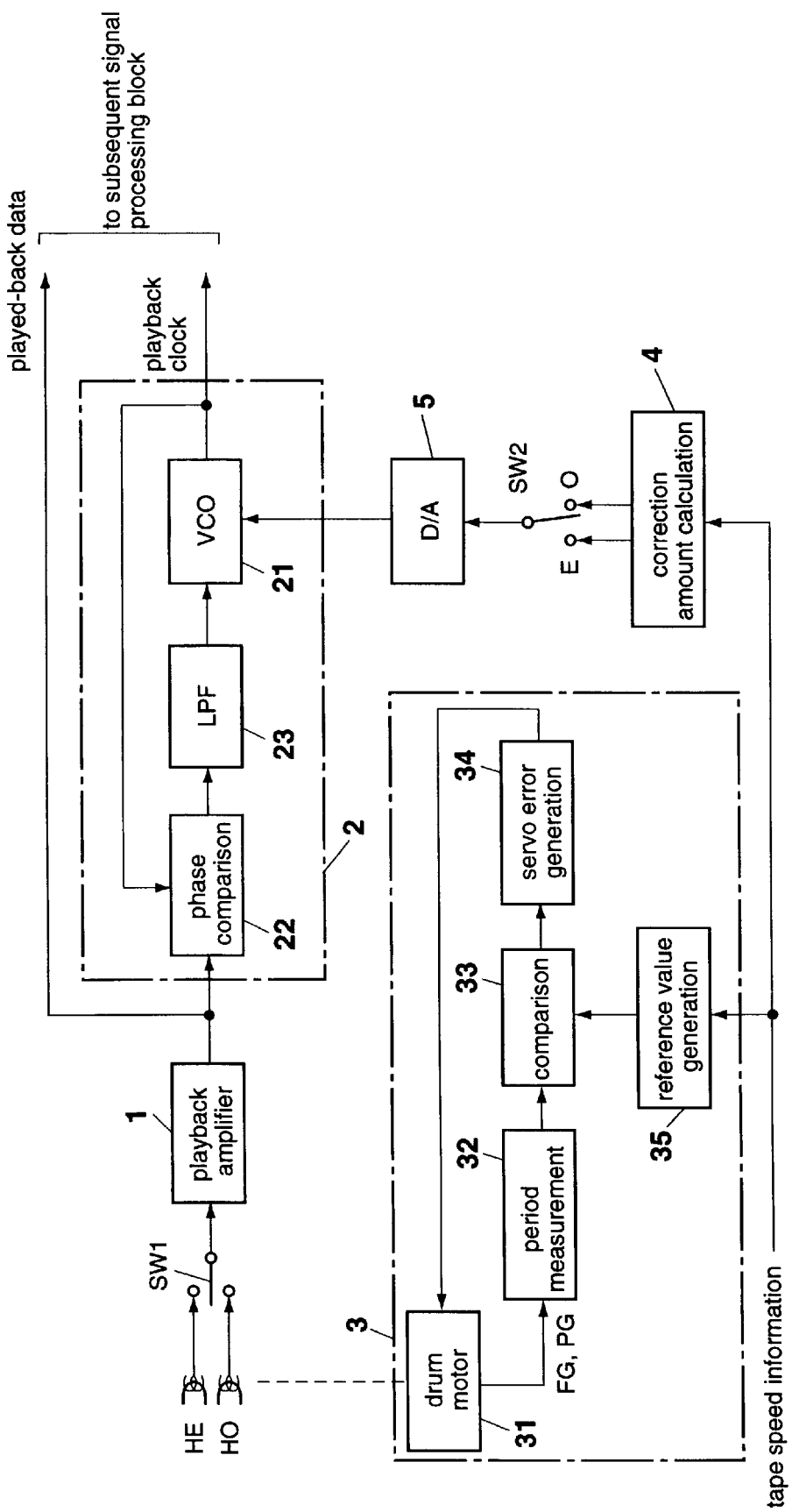
FIG. 1 is a block diagram showing the construction of a main part of a magnetic playback apparatus to which the invention has been applied.

FIG. 1 is a block diagram showing the construction of a main part of a magnetic playback apparatus to which the invention has been applied. This magnetic playback apparatus has a pair of rotating magnetic heads consisting of an odd-channel magnetic head HO and an even-channel magnetic head HE, a first switch SW1 for switching between the outputs of the pair of rotating magnetic heads HO, HE, a playback amplifier 1 for amplifying the output of the first switch SW1, a PLL 2 for generating a playback clock phase-locked to played-back data constituting the output of the playback amplifier 1, a drum servo 3 for executing control so that the pair of rotating magnetic heads rotate with a predetermined rotational period, a correction amount calculating block 4 for calculating an amount of correction of a free-run frequency of the PLL 2 respectively for the even channels and for the odd channels during high-speed playback, a second switch SW2 for switching between the outputs of the correction amount calculating block 4, i.e. between an output for the odd channels and an output for the even channels, and a D/A convertor 5 for converting the output of the second switch SW2 to analog. Here, the rotating magnetic heads HO, HE are disposed in opposite positions 180° apart on a head drum (not shown) and have different azimuth angles. Also, the correction amount calculating block 4 consists of software of a microcomputer.

The PLL 2 is made up of a VCO 21, which oscillates at a predetermined free-run frequency, a phase comparator 22 for comparing the phase of the output of the VCO 21 with that of the played-back data and generating a phase error, and a low-pass filter (LPF) 23 serving as a loop filter.

The drum servo 3 is made up of a drum motor 31, a period measuring part 32 for measuring the rotational period of the drum motor 31 using an FG (Frequency Generator) and a PG (Pulse Generator) generated in correspondence with rotation of the drum motor 31, a comparing part 33 for detecting an error of the rotational period by comparing the output of the period measuring part 32 with the output of a reference value generating part 35 which will be further discussed later, a servo error generating part 34 for generating a servo error using the output of the comparing part 33, and a reference value generating part 35 for generating a reference period supplied to the comparing part 33. Here, the period measuring part 32, the comparing part 33, the reference value generating part 35 and part of the servo error generating part 34 consist of microcomputer software.

The operation of this magnetic playback apparatus will now be explained. First, operation during normal playback, i.e. when playing back data at the same tape speed as that of the time of recording.

The drum motor 31 rotates with a predetermined rotational period, for example 1/9000 (sec). The period measuring part 32 measures the rotational period of the drum motor 31 using the FG and the PG generated in correspondence with the rotation of the drum motor and supplies it to the comparing part 33. The reference value generating part 35 generates a reference period, for example 1/9000 (sec), and supplies it to the comparing part 33. The comparing part 33 supplies the difference between the reference period and the measured period to the servo error generating part 34. The servo error generating part 34 carries out control such as proportional control and integral control on the period difference supplied from the comparing part, converts it into an analog value and supplies it to the drum motor 31. As a result, the drum motor 31 is controlled to rotate with the reference period.

Meanwhile, data played back from the magnetic tape by the rotating heads HO, HE rotated by the drum motor 31 passes through the first switch SW1 switched in synchronization with the rotation of the head drum and is inputted into the playback amplifier 1. The playback amplifier 1 carries out amplification and waveform equalization processing on the inputted data and sends the obtained played-back data to the PLL 2 and to a signal processing block of a subsequent stage (not shown). The PLL 2 so operates that the oscillation output of the VCO 21 phase-locks onto the inputted played-back data. During normal playback, because it is not necessary to correct the free-run frequency of the VCO 21, the correction amount calculating part 4 does not operate. Therefore, no correction voltage is inputted into the VCO 21.

Next, operation during high-speed playback will be explained. Here, high-speed playback is modes wherein the subcode is read while fast-forwarding (FF) or rewinding (REW) is carried out at a speed 200 times that of normal playback, and in the following description these will be respectively referred to simply as the FF mode or the REW mode.

In the magnetic playback apparatus shown in FIG. 1, during operation in the FF mode or the REW mode, tape speed information is supplied to the reference value generating part 35 and the reference value generating part 35 changes the reference period it supplies to the comparing part 33 according to the supplied tape speed information. In this way, even during high-speed playback the relative velocity between the magnetic tape and the magnetic heads is kept the same as at the time of recording. Hereinafter, this processing will be called drum correction.

Next, the effects of drum correction will be described with reference to FIGS. 2A through 3B.

Figure 2A:
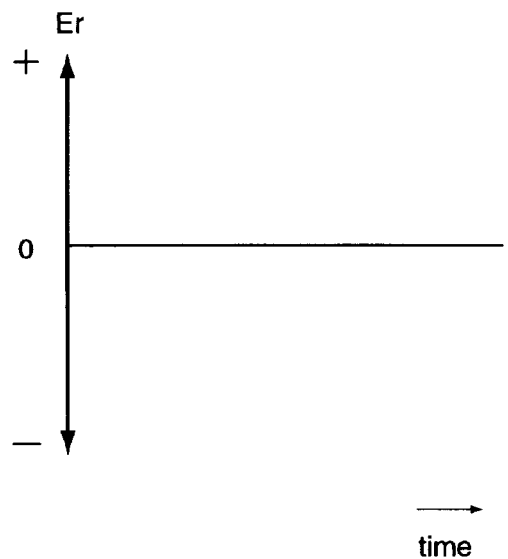
FIGS. 2A through 2D are graphs illustrating effects of drum correction and f0 correction.

FIG. 2A shows an example of an error voltage outputted from the low-pass filter 23 inside the PLL, 2 during normal playback. In this figure, the vertical axis is error voltage Er and the horizontal axis is time. As shown in the figure, during normal playback, because the relative velocity between the magnetic tape and the magnetic heads is the same as at the time of recording, and the same channels are played back by the same head as at the time of recording, the error voltage is in the vicinity of the center.

In the FF mode or the REW mode, on the other hand, because the above-mentioned relative velocity changes greatly, the frequency of the played-back data also changes in correspondence with this. Also, because the odd-channel magnetic head HO and the even-channel magnetic head HE both span about 200 tracks, changes in the frequency of the played-back data due to the difference in the azimuth angle also occur. Consequently, the error voltage outputted from the LPF 23 is as shown in FIG. 2B.

Figure 2B:
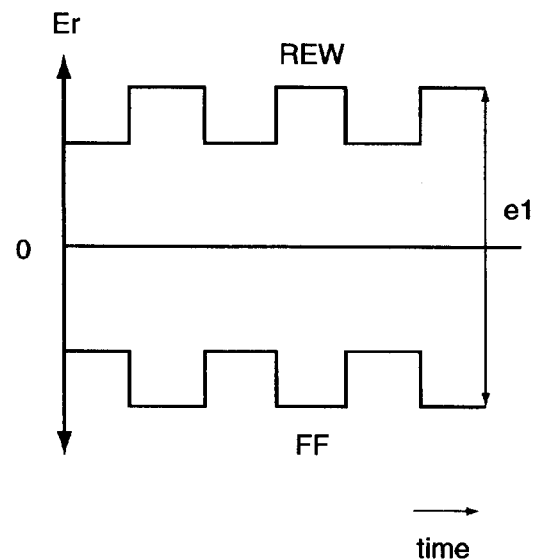
Figure 3A:
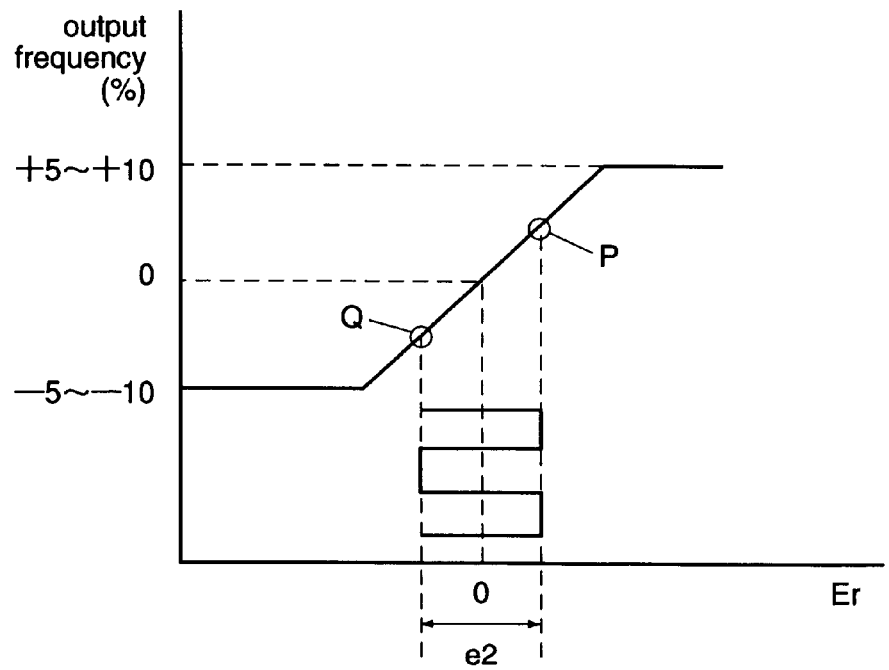
FIGS. 3A and 3B are graphs illustrating f0 correction.

As shown in FIG. 2B, an error voltage corresponding to the frequency changes of the played-back data is produced. Here, the steps in the error voltages in FF and REW are due to the azimuth angle difference, and the level fluctuates once with each trace. In the case of the format of the digital VTR discussed in the above-mentioned literature, the level fluctuation el reaches ±37% with respect to the center value. However, because from the point of view of stability the output range of the PLL 2 cannot be set large, it is set to ±5 to 10%, as shown in FIG. 3A. Consequently, it cannot produce a clock signal of a frequency corresponding to the error voltage.

Figure 2C:
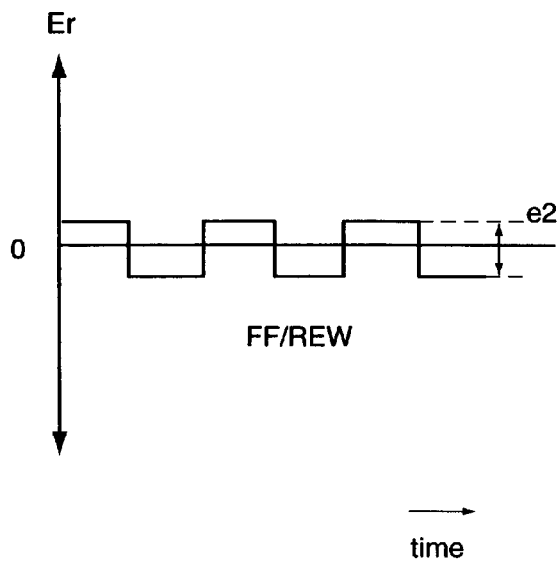

To overcome this, by carrying out the drum correction described above, the average frequency of the played-back data is made the same as it is during normal playback. As a result, the error voltage outputted from the LPF 23 becomes as shown in FIG. 2C. In this figure, e2 is the step due to the azimuth angle difference and is about ±2% with respect to the center value. The operating points resulting from this azimuth angle difference are point P and point Q in FIG. 3B, and when due to a disturbance the speed of rotation of the drum changes and the frequency of the played-back data consequently changes, an error voltage corresponding to this change and centering on the operating points is produced and changes the output frequency. Consequently, because the operating range margins (above point P and below point Q) are narrow, there is little room for any greater fluctuation in the played-back data frequency.

Figure 2D:
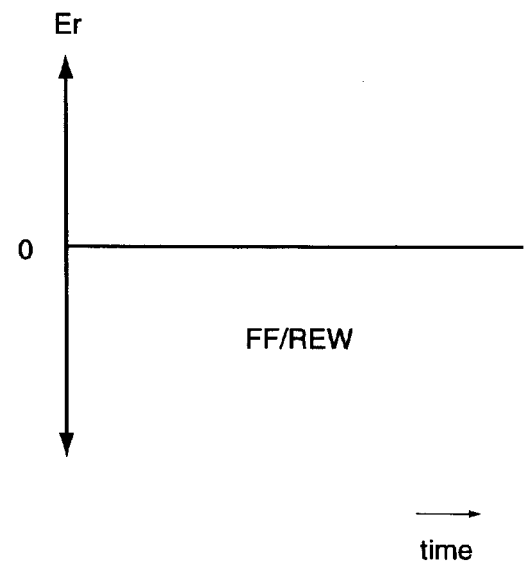
Figure 3B:
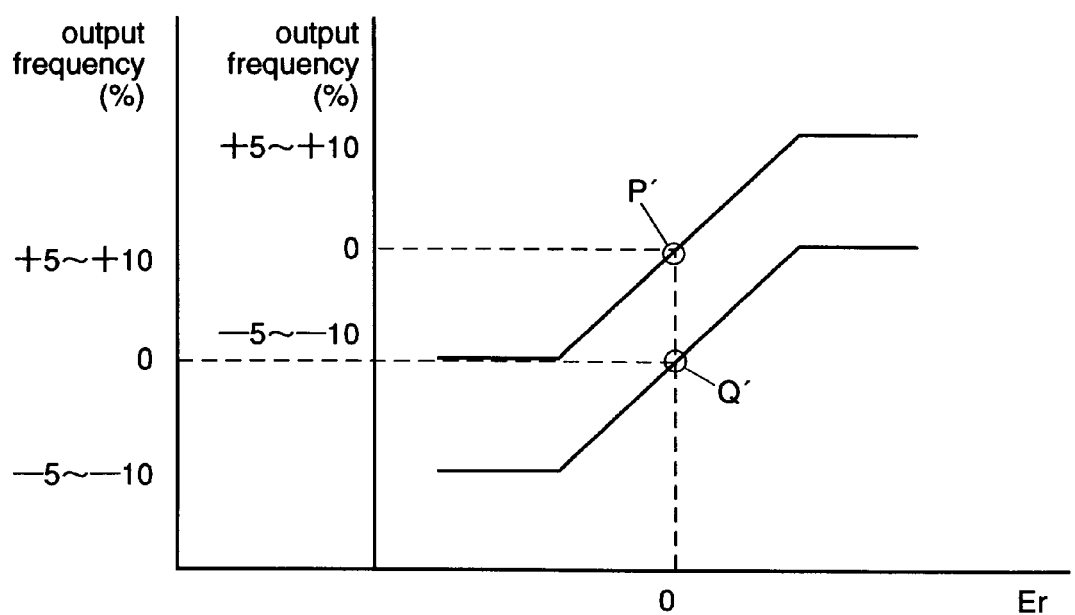

To overcome this, in the magnetic playback apparatus shown in FIG. 1, also, during high-speed playback, respectively for the odd channels and for the even channels the correction amount calculating part 4 calculates and outputs a correction amount for changing the free-run frequency of the VCO 21, i.e. the frequency at which the VCO 21 oscillates when the inputted error voltage is at its center value, and this is converted into an analog voltage by the D/A convertor 5 and supplied to the VCO 21. The free-run frequency of the PLL 2 then changes as shown in FIG. 3B according to the azimuth angle between a point P' and a point Q'. As a result, the error voltage outputted from the LPF 23 becomes the same as during normal playback, as shown in FIG. 2D. Therefore, the operating range of the PLL 2 also is the same as during normal playback, and stability is ensured. Hereinafter, this correction of the free-run frequency will be referred to as f0 correction.

Figures 4, 5A, 5B:
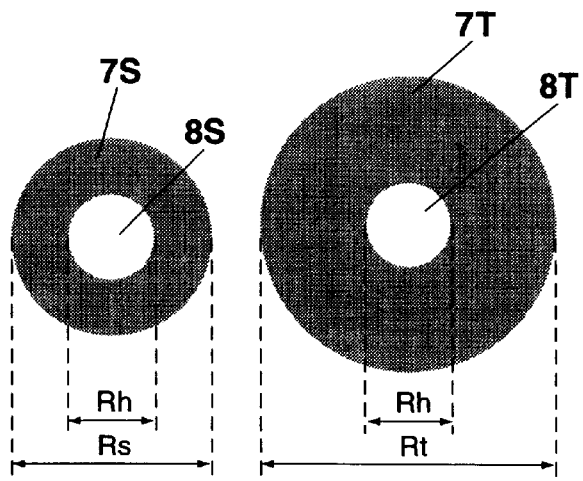
FIG. 4 is a view illustrating a method of obtaining tape speed information.
FIGS. 5A and 5B are tables showing parameters of a magnetic playback apparatus.

Next, with reference to FIG. 4, it will be explained how the tape speed information is obtained. In FIG. 4, 7S is magnetic tape wound on a supply reel (hereinafter referred to as the reel S), 7T is magnetic tape wound on a takeup reel (hereinafter referred to as the reel T), 8S is the hub of the reel S, 8T is the hub of the reel T, Rs is the wound radius of the reel S, Rt is the wound radius of the reel T and Rh is the hub radius of the reel S and the reel T.

In FIG. 4, if the overall length of the magnetic tape is written L and the thickness of the tape is written $\mu$, then:

$$\pi(Rs^2-Rh^2)+\pi(Rt^2-Rh^2)=L\mu \qquad [1]$$

Multiplying both sides of Exp. [1] and rearranging terms, $$\pi(L\mu+2\pi Rh^2)=\pi^2(Rs^2+Rt^2) \qquad [2]$$

The value of Exp. [2] is the sum of the areas of the hub 8S, the magnetic tape 7S, the hub 8T and the magnetic tape 7T (multiplied by $\pi$), and is a fixed value depending on the tape cassette.

Here, when the rotational period of the reel S is written Ts, the rotational period of the reel T is written Tt and the tape velocity is written V, then:

$$V=2\pi(1/Ts)Rs=2\pi(1/Tt)Rt \qquad [3]$$

Obtaining Rs and Rt from Exp. [3] and substituting them into the right side of Exp. [2] yields:

$$V^2(Ts^2+Tt^2)=A \text{ (a constant)} \qquad [4]$$

Therefore, when the tape velocity, the period of the reel S base and the period of the reel T base at normal speed and at n times normal speed are respectively written Vt1 and Vtn, Ts1 and Tsn, Tt1 and Ttn, then:

$$Vt1(Ts1^2+Tt1^2)^{1/2}=Vtn(Tsn^2+Ttn^2)^{1/2}=A^{1/2} \qquad [5]$$

From Exp. [5], and defining a term X1/Xn, we obtain:

$$Vtn/Vt1=(Ts1^2+Tt1^2)^{1/2}/(Tsn^2+Ttn^2)^{1/2}=X1/Xn \qquad [6]$$

Therefore, since the square root X1 of the sum of the squares of the rotational periods of the reel bases at normal speed is equal to the reference tape length, it is possible to detect the tape speed from the ratio between this and the square root Xn of the sum of the squares of the rotational periods of the reel bases at n times normal speed. During normal playback, because the speed of the magnetic tape is determined by the format, the tape speed information is generated without carrying out this kind of measurement.

Next, the reference value generated by the reference value generating part 35 and the correction amount generated by the correction amount calculating part 4 using this tape speed information will be explained. Here, as shown in FIG. 5A the diameter of the head drum will be written $\phi$, the lead angle $\theta$s and the azimuth angle of the head $\alpha$ (=$\pm\theta$a), and as shown in FIG. 5B, for normal speed (during normal playback) and at n times normal speed respectively, the tape transport velocity will be written Vt1, Vtn, the head rotation speed Vh1, Vhn, the relative velocity between the tape and the head Vr1, Vrn, the head trace angle $\theta$1, $\theta$n and the playback signal frequency fp1, fpn.

In FIG. 6A, the relative velocity Vr1 and the trace angle $\theta$1 during normal speed playback are:

$$Vr1=(Vh1^2+Vt1^2-2Vh1Vt1 \cos \theta s)^{1/2} \qquad [7]$$

$$\theta1=\tan^{-1}\{Vh1 \sin \theta s/(Vh1 \cos \theta s-Vt1)\} \qquad [8]$$

Also, the relative velocity Vrn and the trace angle $\theta$n during FF mode operation, shown in FIG. 6B, and REW mode operation, shown in FIG. 6C, are:

$$Vrn=\cos |\theta n-\theta1|\cdot\{Vhn^2+(n\cdot Vt1)^2-2Vhn(nVt1)\cos \theta s\}^{1/2} \qquad [9]$$

$$\theta n=\tan^{-1}\{Vhn \sin \theta s/(Vhn \cos \theta s-n\cdot Vt1)\} \qquad [10]$$

Here, in the FF mode n has a plus value and in the REW mode n has a minus value.

To carry out drum correction it is only necessary to so change Vhn that the relative velocity Vrn at n times normal speed and the relative velocity Vr1 during normal playback are equal, and when accordingly cos $\theta$1, sin $\theta$1, cos $\theta$n, sin $\theta$n are obtained from FIGS. 6A, 6B and 6C, cos($\theta$n−$\theta$1) is substituted into Exp. [9], Vt1/Vh1 is written x and Vhn is obtained for Vr1=Vrn, then:

$$Vhn/Vh1=1+x(\cos \theta s-x)(n-1)/(1-x \cos \theta s) \qquad [11]$$

In Exp. [11], because x and $\theta$s are constants determined by the format, Exp. [11] can be expressed:

$$Vhn/Vh1=1+B(n-1) \qquad [12]$$

Here, B is a constant.

For example in the case of the digital VTR discussed in the above-mentioned literature, $$B=1.8198\times10^{-3}$$

Because the drum servo 3 in FIG. 1 controls by rotational period, writing:

$$Vh1=1/T1$$

$$Vhn=1/Tn$$

yields:

$$Tn=T1/\{1+B(n-1)\} \qquad [13]$$

In other words, during playback at n times normal speed, the reference value generating part 35 should supply to the comparing part 33 a reference period of $1/\{1+B(n-1)\}$ times the reference period T1 of normal playback. In the case of the digital VTR discussed in the above-mentioned literature, $$Tn=(T1\times4396)/(4388+8n)$$

Figure 7A:
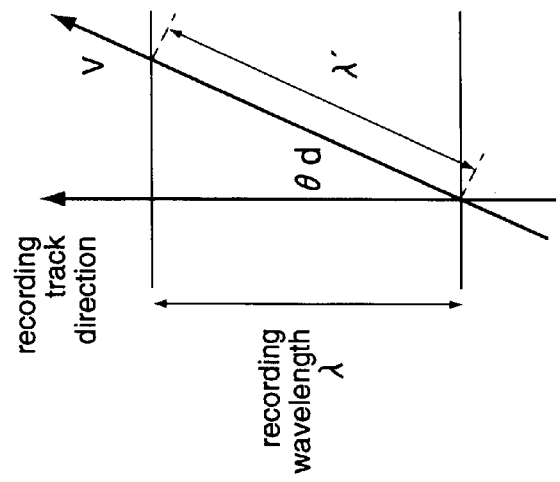
FIG. 7A through 7C are views illustrating playback frequency during high-speed tape transport.

Next, as shown in FIG. 7A, when the azimuth angle is not taken into account, because the time required for playback of a recorded wavelength $\lambda$ at n times normal speed playback is $\lambda'/V=(\lambda/\cos \theta d)/V=\lambda/(V \cos \theta d)$, the relative velocity is equivalent to V cos $\theta$d.

Figure 7B:
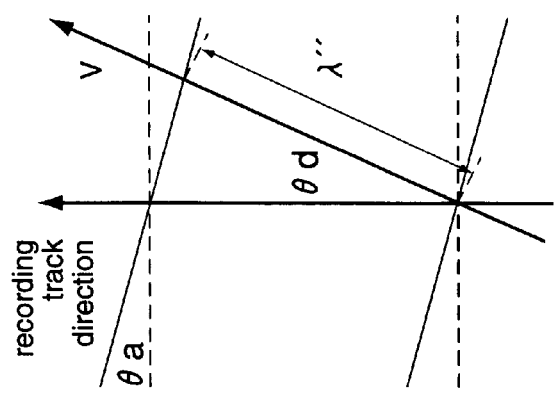
Figure 7C:
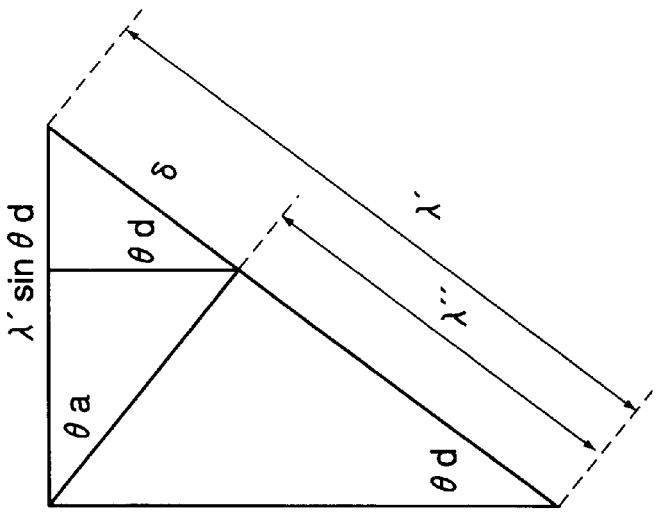

When the azimuth angle is taken into account, as shown in FIGS. 7B and 7C, it becomes:

$$\lambda' \sin \theta d = \delta \sin \theta d + \delta \cos \theta d / \tan \theta a \quad [14]$$

Solving Exp. [14] for δ yields:

$$\delta = \lambda' \tan \theta d \tan \theta a / (1 + \tan \theta d \tan \theta a)$$

Therefore, $$\lambda'' = \lambda' - \delta = \lambda' / (1 + \tan \theta d \tan \theta a) \quad [15]$$

Because the playback frequency is inversely proportional to the wavelength, the result is a further (1+tan θd tan θa) times the result shown in FIG. 7A. The azimuth angles of the magnetic heads are ±; if FIG. 7B is taken as −, in the + case it is (1−tan θd tan θa) times the result shown in FIG. 7A.

In other words, due to the influence of the azimuth angles of the heads, the playback signal frequency fpn during n times normal speed playback can be expressed with respect to the playback signal frequency fpl during normal playback as:

$$fpn = (1 \pm \tan \theta d \tan \theta a) fpl \quad [16]$$

The ± in this expression is + during FF mode operation and − during REW mode operation.

Also, here, $$fpl = 2Vr1/\lambda \quad [17]$$

$$\theta d = \pm(\theta n - \theta 1) \quad [18]$$

Therefore, the ratio Δ by which the free-run frequency of the VCO should be shifted for n times normal speed playback is:

$$\Delta = (fpn/fpl) - 1 = \pm \tan(\theta n - \theta 1) \tan \alpha \quad [19]$$

Substituting Exps. [17], [8] and [10] into Exp. [19] and writing Vt1/Vh1=x, Exp. [19] becomes:

$$\Delta = \pm(1-n)x \sin \theta s \tan \alpha / (1 - x \cos \theta s) \quad [20]$$

Here, because x and θs are constants determined by the format, Exp. [20] can be expressed:

$$\Delta = \pm C(1-n) \tan \alpha \quad [21]$$

Here, C is a constant.

Also, because the sign of tanα changes between + and − according to the azimuth angle, if this is written ±D, Exp. [21] can be expressed as:

$$\Delta = \pm C(1-n) \times (\pm D) \quad [21]$$

In other words, for n times normal speed playback, the correction amount calculating part 4 should produce a correction signal for shifting the free-run frequency by a ratio of ±C(1−n)·(±D). In the case of the digital VTR discussed in the above-mentioned literature, writing the Δ percentage as ε, $$\epsilon \approx \pm(2/187) \times (1-n) \times (\pm 1)\%$$

In this way it is possible to calculate the amount by which the free-run frequency of the VCO 21 should be corrected, but because the VCO 21 is controlled by an analog voltage, the correction amount is converted into a voltage value by the D/A convertor 5. Also, since this magnetic playback apparatus uses open control, it is necessary to know the dispersion of the VCO in advance.

Assuming that the input voltage V, the sensitivity K and the output frequency f of the VCO are in the relationship $$f = K \times V,$$

to obtain the target correction amount it is necessary to know K. Because there is a possibility of K differing among sets or changing in the same set due to ageing or temperature variations, it is re-measured immediately before the correction amount is calculated. Specifically, the sensitivity K is measured at the time of transition to the FF mode or the REW mode and the magnetic tape is transported after completion of this measurement.

Figure 8:
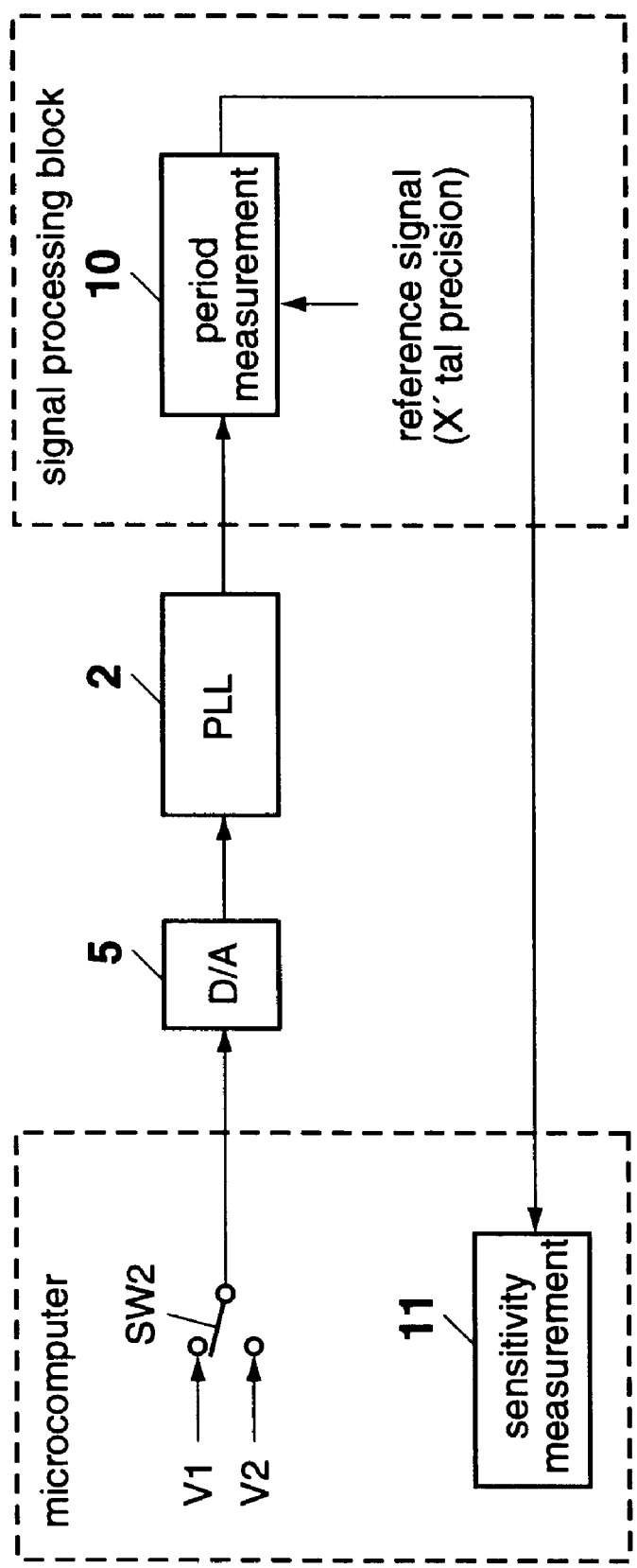
FIG. 8 is a block diagram illustrating a method of measuring the sensitivity of a VCO.

A method of measuring the sensitivity K will now be described with reference to FIG. 8. In FIG. 8, parts the same as parts in FIG. 1 have been given the same reference numbers. A microcomputer successively outputs values corresponding to fixed voltages V1 and V2. These values are converted into analog voltages V1, V2 by the D/A convertor 5 and supplied to the PLL 2. The PLL 2 produces clock signals of frequencies f1, f2 corresponding to the supplied analog voltages V1, V2 and sends them to a period measuring part 10 inside a signal processing block. The period measuring part 10 measures the periods of these clock signals using an internal reference signal, and sends the results to a sensitivity measuring part 11 inside the microcomputer. The sensitivity measuring part 11 calculates:

$$k = \{V2 - V1\} / \{100(f2 - f1)/f0\}$$

k is the voltage value necessary to change the oscillation frequency of the VCO through 1% from the free-run frequency f0. Therefore, when a correction of ε% is required, a correction amount of kε should be produced.

In a magnetic playback apparatus to which the invention has been applied, because open control is carried out with an amount of correction of the free-run frequency of the VCO being calculated on the basis of tape speed information as described above, stable operation of the PLL is achieved without influences of fluctuations of the playback signal and breaks in the signal due to dropout and poor contact of the magnetic heads with the magnetic tape being suffered. In contrast with this, when closed control wherein a correction amount is varied according to a directly detected error voltage is carried out, there is a danger that when the inputted frequency shifts greatly due to an outside disturbance or the like the level of the error voltage will fluctuate greatly and become impossible to detect.

As described above in detail, according to the invention, because even when the tape is being transported at high speed such as during FF/REW mode operation the operating range of the PLL is kept the same as it is during normal playback, the operation of the PLL is stable. Also, because the sensitivity of the VCO is re-measured immediately before the magnetic tape is transported at high-speed, errors caused by ageing and temperature changes can be absorbed. Furthermore, because open control is carried out, the control is not affected by influences of fluctuations of the playback signal and breaks in the signal due to dropout and poor contact of the magnetic heads with the magnetic tape.

What is claimed is:

1. A magnetic playback apparatus for playing back data recorded on diagonal tracks of a magnetic tape using a rotating magnetic head, comprising:

first means for generating a clock signal phase-locked to played-back data;

second means for controlling the rotational period of said rotating magnetic head;

third means for correcting a free-run frequency in said first means according to magnetic tape speed information and including means for measuring immediately before said magnetic tape is transported a t a high speed a relationship between a control voltage and an oscillation frequency in said first means which provides accurate correction of the free run frequency; and fourth means for correcting a rotational period in said second means according to said magnetic tape speed information.

2. A magnetic playback apparatus according to claim 1, wherein data is played back using two rotating magnetic heads having different azimuth angles.

3. A magnetic playback apparatus according to claim 2, wherein said third means also changes the amount by which it corrects said free-run frequency according to said azimuth angles of said rotating magnetic heads.

4. A magnetic playback apparatus according to claim 1, wherein said magnetic tape is transported at a high speed by a reel motor and said magnetic tape speed information is detected on the basis of the rotational period of a reel base.

5. A magnetic playback method for playing back data recorded on diagonal tracks; of a magnetic tape using a rotating magnetic head, comprising:

correcting according to magnetic tape speed information a free-run frequency in first means generating a clock signal phase-locked to played-back data, including measuring immediately before said magnetic tape is transported at a high speed a relationship between a control voltage and an oscillation frequency in said first means which provides accurate correction of the free run frequency; and correcting according to said magnetic tape speed information a rotational period in second means controlling the rotational period of said rotating magnetic head.

* * * * *